United States Patent
Hashimoto et al.

[11] Patent Number: 6,048,607
[45] Date of Patent: *Apr. 11, 2000

[54] POROUS FILM OF HIGH MOLECULAR WEIGHT POLYOLEFIN AND PROCESS FOR PRODUCING SAME

[75] Inventors: Akinao Hashimoto; Kazuo Yagi; Hitoshi Mantoku, all of Waki-cho, Japan

[73] Assignee: Mitsui Chemicals, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/972,449

[22] Filed: Nov. 18, 1997

[30] Foreign Application Priority Data

Nov. 19, 1996 [JP] Japan .................................. 8-322128
Jan. 20, 1997 [JP] Japan .................................. 9-019582

[51] Int. Cl.$^7$ ........................................................ B32B 27/32
[52] U.S. Cl. ................ 428/315.5; 428/220; 210/500.27; 210/500.36; 521/61; 521/918
[58] Field of Search .............................. 428/220, 315.5, 428/315.7, 315.9; 210/500.27, 500.36; 521/61, 918

[56] References Cited

U.S. PATENT DOCUMENTS

| | | | |
|---|---|---|---|
| 4,588,633 | 5/1986 | Kono et al. ............................... | 428/220 |
| 4,620,955 | 11/1986 | Kono et al. ............................... | 264/41 |
| 4,778,601 | 10/1988 | Lopatin et al. .................... | 210/500.27 |
| 4,828,772 | 5/1989 | Lopatin et al. ......................... | 264/45.9 |
| 5,531,899 | 7/1996 | Yen et al. ................................. | 210/638 |
| 5,698,281 | 12/1997 | Bellantoni et al. .................... | 428/35.7 |

FOREIGN PATENT DOCUMENTS

| | | |
|---|---|---|
| 59-215833 | 12/1984 | Japan . |
| 62-223245 | 10/1987 | Japan . |
| 2047031 | 2/1990 | Japan . |
| 7268118 | 10/1995 | Japan . |

OTHER PUBLICATIONS

JP 94002841 Pat. Abst. Jan. 1994.
JP 94053826 Pat. Abst. Jul. 1994.
JP 5017782 Pat. Abst. Mar. 1995.

*Primary Examiner*—Daniel Zirker
*Attorney, Agent, or Firm*—Sherman and Shalloway

[57] ABSTRACT

The present invention relates to a porous or microporous film of a high molecular weight polyolefin excellent in strength and air-permeability and suitable for use in filtering materials, separators for aqueous electrolyte batteries, separator films for batteries, separator films for electrolytic capacitors, and air-permeable films; for moisture-permeable water-proof use such as paper diapers and house-wrapping films; and for other uses such as cloths, package and printing, as well as a process for producing same. The feature of the present invention resides in an aspect that the film is composed of fibrils comprising extended-chain crystals and lamellar crystals and/or fibrils comprising helicoidal crystals.

This porous film of a high molecular weight polyolefin is produced by subjecting an air-impermeable film of a high molecular weight polyolefin to thermal treatment followed by, if necessary, a stretching treatment and/or a thermosetting treatment.

13 Claims, 4 Drawing Sheets

(a)

(b)

F I G 4
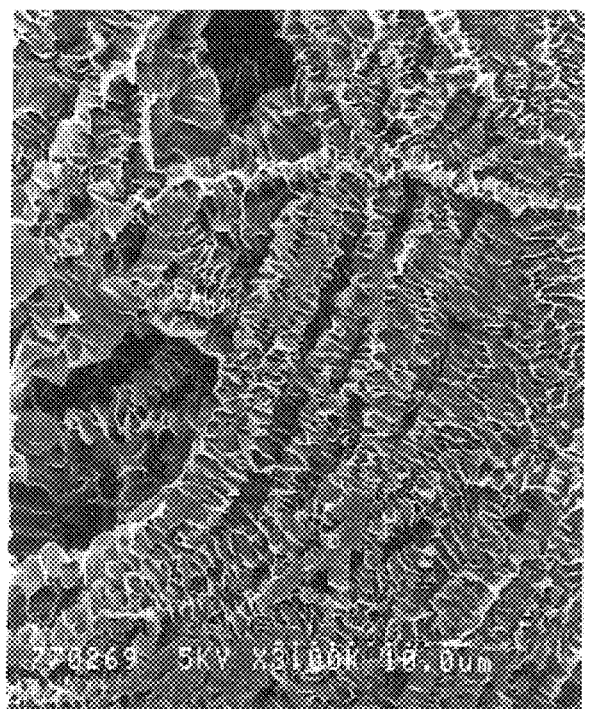
(a)
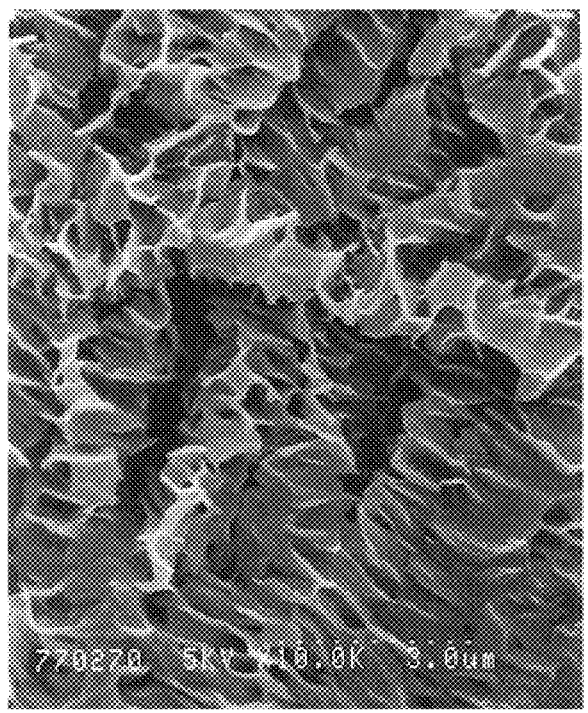
(b)

POROUS FILM OF HIGH MOLECULAR WEIGHT POLYOLEFIN AND PROCESS FOR PRODUCING SAME

BACKGROUND OF THE INVENTION

The present invention relates to a porous (or microporous) film of a high molecular weight polyolefin suitable for use in filtering materials, separators for aqueous electrolyte batteries and the like and to a process for producing same. More particularly, the present invention relates to a porous film of excellent air-permeability obtained by preparing an air-impermeable sheet or film of a polyolefin from a high molecular weight polyolefin as a starting material without addition of a plasticizer or a solvent and thereafter subjecting the air-impermeable sheet or film to a thermal treatment as well as a process for producing same. The present invention further relates to a porous film of the polyolefin possessing excellent strength and air-permeability obtained by stretching the film in at least one direction after the thermal treatment and to a process for producing same.

A number of processes were already proposed for the production of a microporous film of a high molecular weight polyolefin, for example, as seen in Japanese Patent Publn. No. Hei. 6-53826, Japanese Patent Publn. No. Hei. 6-2841 and Japanese Patent Publn. No. Hei. 7-17782.

In order to obtain a microporous film, all of these processes comprise adding a solvent of hydrocarbon series such as decane, dodecane, decaline, a paraffin oil or a mineral oil; a fatty acid hydrocarbon derivative such as a fatty acid, a fatty acid ester and an aliphatic alcohol; a wax of paraffin series; or a plasticizer composed of a low molecular weight compound such as dioctyl phthalate or dibutyl sebacate to a high molecular weight polyolefin, shaping a film from the polyolefin mixture, and then eliminating the low molecular compound from the film.

Above all, the processes proposed in Japanese Patent Publns. Nos. Hei. 6-53826 and Hei. 6-2841 are characterized by eliminating the low molecular compound from the film while stretching it for obtaining a microporous film of high strength.

As a result of extensive research for obtaining a porous film from a high molecular weight polyolefin without addition of a low molecular weight compound which has to be eliminated after all, it has been found by the present inventors that a porous film of excellent air-permeability can be obtained by subjecting a film of a specific high molecular weight polyolefin film to a thermal treatment for making it porous. It has also been found that a porous film of extremely excellent strength and air-permeability can be obtained by stretching the above porous film in at least one direction. The present invention has been accomplished on the basis of the above finding.

SUMMARY OF THE INVENTION

It is an object of the present invention to provide a microporous film composed predominantly of nervate and/or reticulate fibrils obtained by subjecting a specific high molecular weight polyolefin to a thermal treatment under specific conditions and a porous film possessing excellent in strength and air-permeability obtained by further stretching the microporous film in at least one direction as well as a separator film for aqueous electrolyte batteries obtained by subjecting the microporous film to a treatment for making it hydrophilic.

It is another object of the present invention to provide a process for producing a microporous film of a high molecular weight polyolefin without addition of any low molecular compound, which possesses excellent mechanical properties at least as well as those heretofore obtained in case of adding a low molecular weight compound and also possesses a widely controllable range of microporous film functions such as pore diameter, porosity and air-permeability.

BRIEF DESCRIPTION OF THE DRAWINGS

FIG. 3($b$) is a similar photograph taken by an electron microscope of 10,000 magnifications.

FIG. 4($a$) is an electron-microscopic photograph of a porous film of a high molecular weight polyolefin obtained in Exp. No. 28 of the present invention taken by an electron microscope of 3000 magnifications. FIG. 4($b$) is a similar photograph taken by an electron microscope of 10,000 magnifications.

<Notations in the Drawings>

Figure 1:
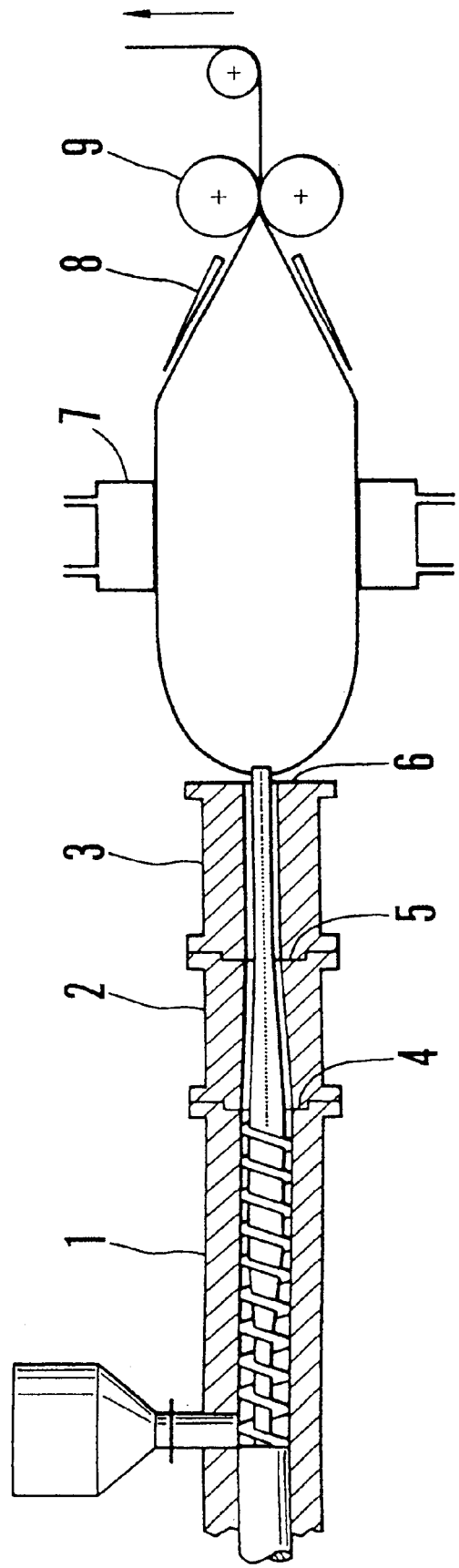
FIG. 1 is a front sectional view showing an example of a shaping apparatus for manufacturing a precursor film of the present invention.

1 Extruder
2 Central portion of Die
3 Exit portion of Die
4 Inlet portion of Tube die
5 Central portion of Tube die
6 Outlet portion of Tube die
7 Cooling Ring
8 Stabilizing plate
9 Pinch Roll

DETAILED DESCRIPTION AND PREFERRED EMBODIMENTS OF THE INVENTION

The present invention has been proposed to achieve the objects and provides a porous film of a high molecular weight polyolefin having an intrinsic viscosity [η] of at least 3 dl/g and comprised predominantly of nervate and/or reticulate fibrils, characterized in that the fibrils comprise extended-chain crystals and lamellar crystals and/or helicoidal crystals. The present invention also provides a porous film of a high molecular weight polyolefin obtained by subjecting a plane-oriented high molecular weight polyolefin to a thermal treatment by melting or dissolving a mainly non-crystalline portion and crystallizing out crystals (forming lamellar crystals) on fibrils while partially molting or dissolving several relatively thin fibrils followed by coagulating them by recrystallization to form a thicker fibril (containing a fibril comprising helicoidal crystals) as well as a process for producing same.

In accordance with the present invention, there is provided a porous film of a high molecular weight polyolefin having an intrinsic viscosity [η] of at least 3 dl/g and composed predominantly of nervate and/or reticulate fibrils, characterized in that the film is constructed by fibrils comprising extended-chain crystals and lamellar crystals and/or fibrils comprising helicoidal crystals.

In accordance with the present invention, there is also provided a porous film of a high molecular weight polyolefin containing the fibrils comprising the lamellar crystals with a width of more than 1 µm and/or the fibrils comprising the helicoidal crystals with a width of more than 1 µm.

In accordance with the present invention, there is further provided a porous film of a high molecular weight polyolefin obtained by subjecting an air-impermeable film substantially free from a plasticizer and/or a solvent to a thermal treatment.

In accordance with the present invention, there is still further provided a porous film of a high molecular weight polyolefin, wherein the aforesaid air-impermeable film is a film obtained by an inflation film shaping method.

In accordance with the present invention, there is still further provided a porous film of a high molecular weight polyolefin having an intrinsic viscosity [η] of at least 3 dl/g and the following characteristic physical properties:

(1) an air-permeability of not more than 1,000 seconds/100 cc;
(2) a bubble point of 0.1–7.0 kg/cm$^2$;
(3) a porosity of at least 30%;
(4) a film thickness of 10–200 µm; and
(5) a piercing strength of at least 3.0 g/µm.

In accordance with the present invention, there is still further provided a porous film of a high molecular weight polyolefin possessing the following characteristic physical properties:

(1) a tensile strength in at least one direction of at least 7 MPa;
(2) a piercing strength of at least 3.0 g/µm;
(3) an air-permeability of not more than 200 seconds/100 cc;
(4) a bubble point of 0.1–5.0 kg/cm$^2$;
(5) a porosity of at least 30%; and
(6) a film thickness of 1–200 µm, which is obtained by subjecting an air-impermeable film substantially free of a plasticizer and/or a solvent to a thermal treatment and stretching the resultant porous film (A) in at least one direction or by stretching the porous film (A) in at least one direction followed by subjecting the stretched film to a thermosetting treatment.

In accordance with the present invention, there is still further provided the porous film of a high molecular weight polyolefin, wherein the porous film (A) is obtained by subjecting an air-impermeable film obtained by inflation film shaping to a thermal treatment.

In accordance with the present invention, there is still further provided a porous film of a high molecular weight polyolefin, wherein the high molecular weight polyolefin is high molecular weight polyethylene.

In accordance with the present invention, there is still further provided a separator film for aqueous electrolyte batteries comprising a porous film of a high molecular weight polyolefin having the following physical characteristic properties:

(1) a tensile strength in at least one direction of at least 7 MPa;
(2) a piercing strength of at least 3.0 g/µm;
(3) an air-permeability of not more than 300 seconds/100 cc;
(4) a bubble point of 0.1–5.0 kg/cm$^2$;
(5) an electrolytic retention rate of at least 200%; and
(6) a film thickness of 1–200 µm, obtained by subjecting an air-impermeable film substantially free from a plasticizer and/or a solvent to a thermal treatment, stretching the resultant film in at least one direction or stretching the resultant film in at least one direction followed by subjecting film to thermosetting and then the subjecting the resultant porous film (B) to a treatment for making it hydrophilic.

In accordance with the present invention, there still further provided a separator film for aqueous electrolyte batteries comprising the porous film of a high molecular weight polyolefin wherein the resultant film after the thermal treatment has the following physical characteristic properties:

(1) an air-permeability of not more than 1,000 seconds/100 cc;
(2) a bubble point of 0.1–7.0 kg/cm$^2$;
(3) a porosity of at least 30%;
(4) a film thickness of 1–200 µm; and
(5) a piercing strength of at least 3.0 g/µm, and/or the porous film (B) before the treatment for making it hydrophilic has the following physical characteristic properties:

(1) a tensile strength in at least one direction of at least 7 MPa;
(2) a piercing strength of at least 3.0 g/µm;
(3) an air-permeability of not more than 200 seconds/100 cc;
(4) a bubble point of 0.1–5.0 kg/cm$^2$;
(5) an electrolytic retention rate of at least 200%; and
(6) a film thickness of 1–200 µm.

In accordance with the present invention, there is still further provided a process for producing a porous film of a high molecular weight polyolefin, which comprises subjecting an air-impermeable film of a polyolefin having an intrinsic viscosity [η] of at least 3 dl/g substantially free of a plasticizer and/or a solvent to a thermal treatment for making porous.

In accordance with the present invention, there is still further provided a process for producing the porous film of a high molecular weight polyolefin, wherein an air-impermeable film of a polyolefin is plane-oriented.

In accordance with the present invention, there is still further provided a process for producing the porous film of a high molecular weight polyolefin, wherein the air-impermeable film of polyolefin is obtained according to an inflation shaping method.

In accordance with the present invention, there is still further provided a process for producing the porous film of a high molecular weight polyolefin, wherein a product of an inflation ratio and a draft ratio in the inflation film shaping method is not more than 200.

In accordance with the present invention, there is still further provided a process for producing a porous film of a high molecular weight polyolefin, which comprises subjecting a porous film composed of a polyolefin having an intrinsic viscosity [η] of at least 3 dl/g obtained by a thermal treatment of an air-permeable film shaped without using any plasticizer and/or a solvent to a stretching treatment in at least one direction at a stretch ratio of at least 1.1.

In accordance with the present invention, there is still further provided a process for producing the porous film of a high molecular weight polyolefin, which comprises thermosetting a porous film or a film which has been made porous and then stretched in at least one direction.

In accordance with the present invention, there is still further provided a process for producing the porous film of a high molecular weight polyolefin, wherein the high molecular weight polyolefin is a high molecular weight polyethylene.

In accordance with the present invention, there is yet further provided a process for producing a separator film for aqueous electrolyte batteries which comprises the porous film of a high molecular weight polyolefin, wherein the high molecular weight polyolefin obtained by the process mentioned above has been made hydrophilic with a surfactant and/or a sulfonating agent.

Below are the starting materials, a method for shaping the precursor film, a treatment method, a stretching method and the characteristics of the resultant film with respect to the porous film of a high molecular weight polyolefin and a process for producing same in the present invention.

(Starting Material)

The high molecular weight polyolefin used in the present invention is obtained by polymerizing ethylene, propylene and an α-olefin having carbon atoms of 4–8 alone or together with at least two combinations of these olefins, for example, in slurry polymerization by the aid of a Ziegler catalyst. Preferable copolymers are those from ethylene and a small amount of propylene or those from ethylene or one or at least two combinations of the α-olefins having carbon atoms of 4–8.

In case of an ethylene copolymer, the amount of the comonomer is preferably 5 mol % or less in view of a merit that the temperature for the thermal treatment is widely chosen. Among these, especially preferable is a homopolymer of ethylene.

The molecular weight of the starting material is such that the molecular weight in terms of the intrinsic viscosity $[\eta]$ is at least 3 dl/g at the time of shaping an inflation film. A starting material of an intrinsic viscosity $[\eta]$ of less than 4 dl/g is preferable since it can be shaped by a conventional inflation film shaping apparatus. A molecular weight in term of an intrinsic viscosity $[\eta]$ is at least 4 dl/g, preferably 4–25 dl/g, more preferably 5–20 dl/g and most preferably 8–20 dl/g especially for the purpose of obtaining a microporous film of high strength.

A starting material having an intrinsic viscosity $[\eta]$ exceeding 25 dl/g tends to become inferior in shaping inflation films because of its too high melt viscosity in shaping a precursor film as will be described hereinafter.

(Precursor Film)

An impermeable film obtained according to an inflation film shaping method is substantially composed of a polyolefin.

By the term "substantially composed of polyolefin" is meant that the starting polyolefin is not incorporated with a large amount of a solvent and/or a plasticizer at the time of shaping the inflation film. Consequently, a variety of additives usually incorporated into polyolefin, such as a heat-resisting stabilizer, an anti-weathering agent, a lubricant, an anti-blocking agent, a slipping agent, a pigment, a dye and the like may be incorporated within the extent in which the objects of the present invention are not damaged. However, the upper limit of the total amount of such additives is preferably not more than 10% by weight and more preferably not more than 5% by weight.

Among the polyolefins, those having an intrinsic viscosity $[\eta]$ of less than 5 dl/g, in particular less than 4 dl/g can be shaped according to an ordinary inflation film shaping method.

Concerning details of the inflation film shaping method, a general method using polyethylene or polypropylene is mentioned as referred to in Edition 4, Chapter 2 of a Japanese book entitled "Extrusion molding of plastics and its application" written by Keiji Sawada and published by Seibundo Shinko-sha (1966).

As compared with the inflation film shaping method, a T-die film shaping method gives a film which is oriented in one direction when subjected to melt stretching so that the film has to be subjected, after shaping, to an after-treatment to effect planar orientation. In case of the inflation film shaping method, however, a planar orientation of the film can be attained on shaping the film by properly selecting an expansion ratio on shaping.

A preferable condition for the inflation film shaping of the precursor film in the present invention is to adjust a draft ratio and the expansion ratio to a specific range. By the term "draft ratio" is meant herein a ratio of a take-out velocity of a tubular film cooled and solidified to a flow-out velocity (a line velocity) of the film resin at a lip exit of an inflation film die. By the term "expansion ratio" is meant herein a ratio of a circumferential length of a tubular film cooled and solidified to a circumferential length of a tubular film before expansion at a die exit of the inflation film die.

In a usual case, the draft ratio is adequately adjusted to at least 2, but a preferable draft ratio is at least 3, while the expansion ratio is adequately adjusted within a range from 1.1 to 20.

In case of a high molecular weight polyolefin having an intrinsic viscosity $[\eta]$ within a range from 5 dl/g to 25 dl/g, a precursor film can be obtained in the following manner:

According to a inflation shaping method, the high molecular weight polyolefin is molten in a screw extruder and extruded from a tubular die having a L/D ratio of at least 5 wherein a mandrel rotates alone or together with the screw, expanded to a predetermined expansion ratio in such manner that a gas is blown into a tubular film in a molten state, and then cooled to a film.

In this case, the notation "L" means herein a length of tubular die constructed by a mandrel and an outer die, while the notation "D" means herein an inner diameter of the die at the exit of a screw die. An embodiment of an inflation film shaping apparatus is described in detail in Japanese Patent Publn. No. Hei. 6-55433 in detail.

A daft ratio preferable in the present invention is 3–20, and more preferably 4–15. On the other hand, an expansion ratio is 3–20 and more preferably 4–15. In case a porous film of a larger tubular diameter is required, a draft ratio is set to not more than 15 while an expansion ratio is set to not more than 15 whereby a product of the draft ratio and the expansion ratio becomes not more than 200, preferably not more than 150, and more preferably not more than 130.

In either of the inflation film shaping method and the T-die film shaping method, the resultant precursor film is an air-impermeable film which is plane-oriented and has an intrinsic viscosity $[\eta]$ of 3–25 dl/g, a crystallinity of preferably at least 50%, more preferably 60–70%, a tensile strength in machine direction of at least 0.03 GPa, preferably at least 0.04 GPa, a tensile strength in perpendicular to the machine direction of at least 0.02 GPa, preferably at least 0.04 GPa, a moisture permeability coefficient of at least 0.45 g·mm/m²·24 Hr under the condition that a temperature is 40° C. and a humidity is 90%. By the term "air-impermeable film" is meant herein a film having an air-permeability of at least 10000 seconds/100 cc in an air-permeability test as will be described hereinafter. No particular limitation exists in thickness of the resultant precursor film, but the thickness is preferably 5–500 μm, more preferably 5–200 μm in view of convenience in handling in the subsequent treatment step.

The crystallinity of the precursor film determined from the heat of crystal fusion measured by means of a differential scanning calorimeter (DSC) is preferably at least 50%, more preferably 60–70% in case of polyethylene. In case of a polyolefin other than polyethylene, the crystallinity of the precursor film is preferably at least 40%, more preferably at least 50%.

If a film obtained according to the aforesaid inflation film shaping method has a crystallinity of less than 50% in case of polyethylene and less than 40% in case of polyolefin other than polyethylene, there may be the case wherein porosity does not attain at least 30% when the film is made porous according to the process of this invention. In such case, the crystallinity of the film may be enhanced by performing a preliminary thermal treatment carried out in the atmosphere of a gas (air or nitrogen), and then the film is subjected to the thermal treatment for making porous.

The treated film in the present invention is preferably plane-oriented. If planar orientation of the film is too excessive, relaxation of the film hardly takes place during the thermal treatment so that pore diameter cannot be increased. If the film is not plane-oriented, on the other hand, the film is elongated and loosened during the thermal treatment so that the technical effect of the thermal treatment cannot be attained. It is therefore recommendable that film be plane-oriented within the aforesaid expansion and draft ratios.

By the term "planar orientation" is meant herein that crystals are oriented biaxially. The wording "crystals are oriented biaxially" in turn means the state wherein any of the axis a and the axis b except the axis c corresponding to the molecular chain direction among unit crystals of polyolefin in the film plane are chiefly existent in perpendicular to the film plane, and also the state that any other axis than the relevant axis, for example, the axis c is distributed in almost non-orientation in the film plane. In case of polyethylene the axis existing in perpendicular to the film plane corresponds usually to the axis a, but in the case of other polyolefins it corresponds usually to the axis b.

Such state can be confirmed by observation according to an X-ray diffraction apparatus as follows: When a film is arranged from the "end" direction to the "equatorial" direction and X-rays are projected to observe its diffraction pattern, an orientation coefficient fa in case of polyethylene (fb in case of the other polyolefins) is at least 0.2, and when a film in the machine direction is arranged in the "meridian" direction and X-rays are projected from the "through" direction to observe its diffraction pattern, an orientation coefficient fc is from −0.2 to 0.2.

A means for obtaining the orientation coefficient fa, fb and fc and a method for its calculation are described in the chapter of Selective Orientation in a Japanese book entitled "X-ray Diffraction of High Molecules Vol. A" (written by Leroy E. Alexander, translated by Ichiro Sakurada, published by Kagaku Dojin Co.)

Especially in case fc exceeds 0.2 (in the axis c oriented state) or fa is less than 0.2, the precursor film sometimes cannot be made porous by the thermal treatment even if its crystallinity satisfies the aforesaid condition. By the way, the precursor film having an intrinsic viscosity [η] of less than 3.0 dl/g may be made porous according to a certain condition but may not be satisfied in aspect of tensile strength.

(Thermal Treatment)

A thermal treatment of the aforesaid precursor film is preferably carried out, for example, usually at a temperature of 100–145° C. for one minute or more in case of polyethylene, although the condition may be changed depending on the state of atmosphere. In this case, the precursor film is restrained preferably in at least one direction, most preferably in rectangular biaxial directions to prevent shrinkage. If shrinkage is unavoidable, a preferably permissible range of shrinkage is 10% in lengthwise and lateral directions.

In case the precursor film is biaxially fixed, it is made porous by the above treatment. In case a specific first liquid as will be defined hereinafter is used, the film is dried while being fixed to obtain a porous film.

Air is a preferable atmosphere for the thermal treatment, but it is also preferable to perform the thermal treatment in a first liquid which has a mild affinity to the high molecular weight polyolefin. The wording "has a mild affinity to the high molecular weight polyolefin" is used herein to mean that when a precursor film of the high molecular weight polyolefin is shaped and dipped in a first liquid at a treating temperature, the first liquid scarcely act on a crystalline portion of the precursor film but is chiefly permeated in a non-crystalline portion to melt or dissolve it selectively and crystallize out a part thereof on cooling whereby the crystallinity is increased as a whole. Thus, a solvent having a stronger affinity and capable of dissolving the polyolefin crystals at a temperature of the thermal treatment is excluded from the first liquid.

The wording "having an affinity to the high molecular weight polyolefin" also means that a liquid is sufficiently familiar with the high molecular weight polyolefin, or in other words, a liquid has a small surface tension to the polyolefin. A criterion there for is such that a liquid has to exhibit a contact angle of not more than 100°, preferably not more than 90° and more preferably not more than 80°. By the way, surface tension can be measured according to a usual manner using a commercially available automatic contact anglemeter.

A liquid incapable of dissolving the polyolefin crystals at a temperature of the thermal treatment used in the present invention means a liquid which does not depress the melting point of high molecular weight polyolefin alone by 20° C. or higher when a second run of the melting point of the high molecular weight polyolefin is observed in the presence of the solvent with a differential scanning calorimeter (DSC) in which a solution cell has been installed. As affinity of a liquid to high molecular weight polyolefin also varies according to the treatment temperature, the sort of liquid and the treatment temperature are properly selected to enhance the effect of making the film porous up to the maximum degree.

Illustrative of such first liquid are, for example, lower aliphatic alcohols such as ethanol, propanol, butyl alcohol, and amyl alcohol; lower aliphatic ketones such as acetone, methyl ethyl ketone and cyclohexanone; lower fatty acid esters such as ethyl formate and ethyl acetate; halogenated hydrocarbons such as carbon tetrachloride, perchloroethylene and chlorobenzene; hydrocarbons such as heptane, cyclohexane, octane, decane and dodecane; nitrogen-containing organic compounds such as pyridine, formamide and dimethylformamide; and ethers such as methyl ether, ethyl ether, dioxane and butyl cellosolve. In addition, glycols such as monoethylene glycol, diethylene glycol and triethylene glycol; surfactants and silicone oils generally utilizable as a heating medium are also preferable liquids. These liquids can be used as a mixture of at least two.

A warm water containing a surfactant and hot water is also effective as the liquid, but benzene, xylene and tetraline are not preferable since these solvents dissolve high molecular weight polyolefin at the treatment temperature.

A preferable first liquid for polyethylene and polypropylene includes octane, decane, dodecane, paraffin oil, molten paraffin wax, a liquid containing these ingredient as a main component, and a composition containing at least one of these ingredients.

A temperature for the thermal treatment varies according to the sorts of polyolefin and the first liquid. As described above, for example, a temperature of usually 100–145° C., preferably 115–140° C. for polyethylene. A treatment temperature for polyolefin other than polyethylene is usually 50–170° C., preferably 80–160° C. A treating time is generally is a period from 10 seconds to 10 minutes, preferably from 30 seconds to 5 minutes after the precursor film has reached the treating temperature. The treating time can be shortened as the treating temperature becomes higher. An excessive treating time rather tends to deteriorate tensile strength of the resultant porous film and is preferably to be avoided.

The precursor film shaped by an inflation film shaping machine is in the form of a tubular film wound up while pressed with a pinch roll. On the thermal treatment, one edge of the film is cut off to form a single film to be treated. In case of the inflation film, it is unnecessary to cut both edges (ear portions) of the film as in T-die film and thus the inflation film is superior in aspect of yield, as compared with the T-die film shaping method.

(Dipping into a Low Boiling Point Liquid and Drying)

The film subjected to the thermal treatment in the liquid is then subjected to a drying treatment. According to the sort of liquid used for the treatment, the liquid may be evaporated by direct drying with warm or hot blast if the film is fixed in two directions to prevent shrinkage. In case of the first liquid which is relatively slow in drying speed, it is preferable that the treated film is dipped into a second liquid compatible with the first liquid and lower in boiling point than the first liquid but inferior in affinity to polyolefin and then dried up. On drying, the treated film is fixed preferably at least in one direction, more preferably in rectangularly two directions. If shrinkage is unavoidable, a preferably permissible range of shrinkage is 10% in lengthwise and lateral directions.

Illustrative of the utilizable second liquid are low boiling point hydrocarbons such as hexane and heptane; chlorine-substituted low boiling point hydrocarbons such as methylene chloride; and chlorine and fluorine-substituted low boiling point hydrocarbons such as 1,2-dichloro-2,2,2-trifluoroethane, 1,1-dichloro-1-fluoroethane, 1,3-dichloro-1,1,2,2,3-pentafluoropropane and 2,2,3,3,3-pentafluoropropanol. Concerning the dipping temperature and the dipping time, a minimum temperature and shortest period of time are selected so long as substitution of the liquids is completely carried out below the thermal treatment temperature.

(Stretching)

Although the present invention provides a porous film of a high molecular weight polyolefin and a process for producing same wherein an air-impermeable film of a polyolefin substantially free of a plasticizer and/or a solvent and having an intrinsic viscosity [η] of at least 3 dl/g is subjected to the thermal treatment under restraint, stretching may be carried out after the thermal treatment for obtaining a porous film of stronger tensile strength or adjusting porosity or pore diameter of the resultant film.

Stretching is carried out at a temperature below the melting point of the film after the thermal treatment. The lower limit of the stretching temperature depends on the sort of high molecular weight polyolefins used. In case the high molecular weight polyolefin is polyethylene, the stretching temperature is within the range from 80° C. to the melting point of the film after the thermal treatment, preferably 100–130° C. A stretch ratio is at least 1.1, preferably at least 1.5, and more preferably 1.5–5 in case of uniaxial stretching.

In this uniaxial stretching, a uniaxial stretching with a definite width is preferable. In case of biaxially stretching, an area ratio is 1.5, preferably 1.5–25.

The stretching may be carried out in atmosphere of air or in contact with the first liquid which, as described in the paragraph of the foregoing thermal treatment, has an adequate affinity to the high molecular weight polyolefin and does not dissolve the film after the thermal treatment at a stretching temperature.

A method for stretching the film may be any one of the uniaxial stretching wherein shrinkage in transverse direction (width loss) is minimized, the uniaxial stretching wherein shrinkage in transverse direction is prevented by way of tenter clips, the sequential or simultaneous biaxial stretching wherein a total tenter clip system is used as conducted in an ordinary biaxial stretching testing apparatus, the continuous and sequential biaxial stretching wherein a first stretching step is conducted by way of a pair of rolls and a second stretching step is then conducted by way of tenter clips in transverse direction, and the continuous and simultaneous biaxial stretching wherein a continuous tenter clip system is used.

(Thermosetting)

The porous film after drying or stretching may be subjected to a thermosetting treatment for removing wrinkles on the film, adjusting porosity and thickness of the film, minimizing the surface friction resistance of the film and minimizing thermoshrinkage of the film. The term "thermosetting" is used herein to mean heating of the porous film in the state of fixing it in two rectangularly crossed directions. A temperature, a treating time and the like which are necessary for furnishing the film with desired physical properties in a gas (air) atmosphere are suitably selected as conditions in this case. In usual, an optimum temperature and time are determined below the melting point of the film after the treatment. It is necessary that the treating time is shortened as the temperature becomes higher but the treating time is prolonged as the temperature becomes lower.

(Porous Film of High Molecular Weight Polyolefin)

It is an important feature that the porous film of high molecular weight poyolefin obtained according to the thermal treatment is comprised predominantly of nervate and/or reticulate fibrils.

By the term "nervate and/or reticulate fibrils" is meant herein a state of the film wherein the fibrils constituting the film have thick trunk fibers and thin fibers connecting thereto on the outside of the trunk fibers, the thin fibers forming a complicate reticulate structure.

The fibrils constituting the film comprises (A) fibrils consisting of extended-chain crystals and lamellar crystals and (B) fibrils consisting of helicoidal crystals.

As an example of the structure and form of fibrils in high molecular materials, a discussion has been made on solution crystallized substances under stress, for example, in A. J. Pennings, A. A. Kiel, Kolloid Z., 205, p.160(1955); A. Keller, J. Machin, J. Macromol. Sci., B1, p.41(1967), etc. or in K. Kobayashi, T. Nagasawa, J. Macromol. Sci. Phys., B3, p.153(1970); T. Nagasawa, Y. Shimomura, J. Polymer Sci. Polymer Phys. Ed., 12, P.2291(1974).

In these references, two construction models are proposed as showing structure of the fibrils; one of them showing the structure comprising extended-chain crystals formed in the center of the fibrils and lamellar crystals formed by molecular chains pendent from the extended-chain crystals and the other showing fibrils formed by orienting a helicoidal transition existent in crystal nuclei comprising folded chains in a flowing direction. The extended-chain crystals existing in the former model is not necessary in the fibrils.

Fibrils (A) arbitrarily defined herein which comprise the extended-chain crystals and the lamellar crystals correspond to the aforesaid former construction model and are crystals of so-called shish-kebab structure. These fibrils show such a structure that the extended-chain crystals in the form of fibers are existent in the central part thereof and the folded-chain crystals (lamellar crystals) are periodically constructed around the extended-chain crystals as nuclei, and their structure is shown in detail in FIG. 3..

On the other hand, fibrils (B) arbitrarily defined herein which comprise the helicoidal crystals correspond to the latter construction model and have such a structure that fibrous crystals in the central part are not or a little observed and the lamellar crystals comprising the folded chain are formed spirally, and their structure is shown in detail in FIG. 4.

The fibrils (A) comprising the extended-chain crystals and lamellar crystals have a thickness measured as width of the lamellar crystals of at least 0.1 μm, preferably at least 0.5 μm and more preferably 1–10 μm and usually contain a thickness beyond 1 μm. The thickness of the fibrils tends to increase as a temperature of the thermal treatment with the first liquid becomes higher if the air-impermeable film before the thermal treatment is same. The thickness of the fibrils likewise tends to increase as a product of the expansion ratio and the draft ratio becomes smaller if the temperature of the thermal treatment is same. In addition, thicker fibrils tend to be formed as [η] of the starting air-impermeable film becomes smaller.

The fibrils (B) comprising the helicoidal crystals have a thickness, which is measured as a width of the helicoidal crystals, of at least 0.1 μm, preferably at least 0.5 μm and more preferably 1–10 μm and usually contain a thickness beyond 1 μm. Change in thickness of these fibrils shows the same tendency as in the fibrils comprising the extended-chain crystals and the helicoidal crystals.

When the same air-impermeable film is used for investigating conditions for the formation of the aforesaid two fibrils, it has been found that the fibrils (A) are easily formed if the temperature for the thermal treatment is low but the fibrils (B) tend to be formed as the temperature for the thermal treatment becomes higher. In case the starting film has a high [η] value (for example, about 15 dl/g), the fibrils (A) are formed at almost all temperature range for the thermal treatment. Contrary to this, if the starting film has a low [η] value (for example, about 5 dl/g), a temperature range of the thermal treatment permitting to form the fibrils (B) becomes relatively broader.

Figure 3:
FIG. 3($a$) is an electron-microscopic photograph of a porous film of a high molecular weight polyolefin obtained in Exp. No. 27 of the present invention taken by an electron microscope of 3000 magnifications.
Figure 3:
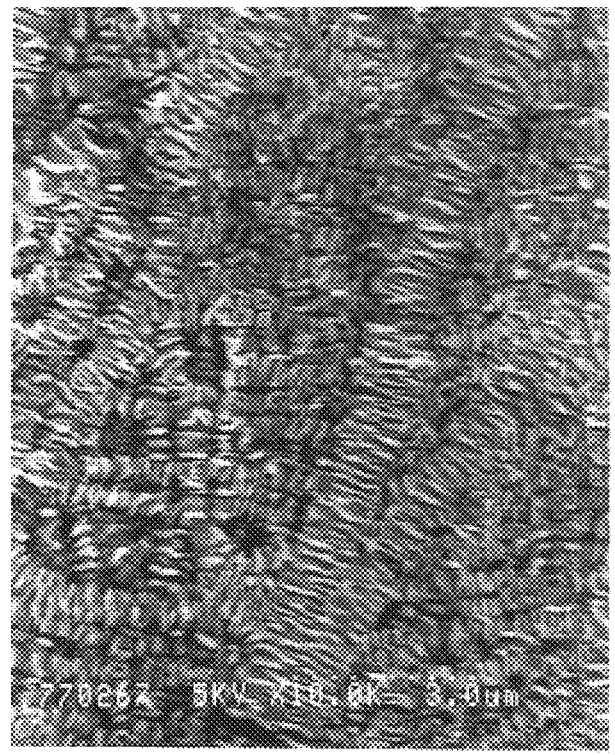

The state of these fibrils is shown in the accompanying FIGS. 3 and 4 which are electron-microscopic photographs.

FIG. 3(a) is an electron-microscopic photograph of a porous film of high molecular weight polyolefin obtained in the under-mentioned Exp. No. 27 taken by an electron microscope of 3,000 magnifications. FIG. 3(b) is a similar electron-microscopic photograph taken by an electron microscope of 10,000 magnifications. FIG. 4(a) is an electron-microscopic photograph of a porous film of high molecular weight polyolefin obtained in the under-mentioned Exp. No. 28 taken by an electron microscope of 3,000 magnifications. FIG. 4(b) is a similar electron-microscopic photograph taken by an electron microscope of 10,000 magnifications.

As are evident from FIGS. 3 and 4, the porous films of high molecular weight polyolefins of the present invention attain high air-permeability due to enlargement of the pore diameter by increasing thickness of the nervate and/or reticulate fibrils and decreasing the number of fibrils per unit area.

The air-permeability can be enhanced (Gurley seconds can be decreased) by setting the temperature of the thermal treatment higher and is 1,000 seconds/100 cc or less, preferably 500 seconds/100 cc and more preferably 200 seconds/100 cc in terms of Gurley second. In case the temperature of the thermal treatment is too high or a period of time for the thermal treatment is excessively longer, the surface of the film is dissolved and the air-permeability is undesirably lost.

The bubble point becomes lower as the pore diameter becomes larger and is usually 0.1–7.0 kg/cm². This value is preferably 0.1–5.0 kg/cm².

The porosity is at least 30%, preferably at least 50%, more preferably at least 60% and most preferably at least 70%. The porosity can properly be adjusted by thermosetting after the formation of the porous film.

The thickness of the film is 10–200 μm while the piercing strength is at least 3.0 g/μm, preferably 5.0 g/μm and more preferably at least 6.0 g/μm.

Accordingly, the microporous film of high molecular weight polyolefin after the thermal treatment in accordance with the present invention possesses the following characteristics:

(1) an air-permeability of not more than 1,000 seconds/100 cc;

(2) a bubble point of 0.1–7.0 kg/cm²;

(3) a porosity of at least 30%;

(4) a film thickness of 10–200 μm; and (5) a piercing strength of at least 3.0 g/μm.

In the present invention, a porous film of high molecular weight polyolefin obtained by stretching the film after the thermal treatment in at least one direction is also composed predominantly of the nervate and/or reticulate fibrils.

In comparison with the film after the thermal treatment, the film after the stretching is not distinct in the state of fibrils forming the film, and so far as the shape is observed, the film is constructed by fibrils comprising the extended-chain crystals and the lamellar crystals, fibrils comprising the helicoidal crystals and other various fibrils comprising crystals of a transition period.

The tensile strength is at least 7 MPa in at least one direction, preferably at least 9 MPa in at least one direction, more preferably at least 10 MPa in at least one direction, further preferably at least 15 MPa and especially preferably 20 PMa in at least one direction.

The piercing strength is at least 3.0 g/μm, preferably at least 6 g/μm, more preferably 9.0 g/μm and further preferably at least 10 g/μm. The air-permeability can be increased by enhancing the stretch ratio (decreased in case of Gurley second), and is not more than 200 seconds/100 cc, preferably not more than 100 seconds/100 cc and more preferably not more than 80 seconds/100 cc. The air-permeability of the porous film after stretching is affected by the size of the pores in the thermally treated film before stretching, and tends to good as the thickness of the fibrils before stretching becomes larger (i.e. the pore diameter becomes larger).

The bubble point becomes smaller as the pore diameter becomes larger, and is usually 0.1–5.0 kg/cm² and preferably 0.1–4.0 kg/cm². As in the case of the air-permeability, larger the pore diameter of the film before stretching, lower the bubble point of the film after stretching.

An impermeable film (a dissolved membrane exists on the surface of the film) formed by an excessive thermal treatment can be converted into an air-permeable film after stretching.

The porosity is at least 30%, preferably at least 50%, more preferably at least 60% and further preferably at least 70%.

The porosity can properly be controlled by thermosetting to be conducted after the formation of the porous film.

The thickness of the film is 1–200 μm.

In the present invention, the porous film of a high molecular weight polyolefin obtained by stretching the thermally treated film in at least one direction has the following physical characteristics:

(1) a tensile strength in at least one direction of at least 7 MPa;

(2) a piercing strength of at least 3.0 g/μm;

(3) an air-permeability of not more than 200 seconds/100 cc;

(4) a bubble point of 0.1–5.0 kg/cm$^2$;

(5) a porosity of at least 30%; and (6) a film thickness of 1–200 μm.

In the present invention, the porous film of a high molecular weight polyolefin obtained by subjecting the thermally treated and then at least monoaxially stretched film to the thermosetting treatment has the following physical characteristics:

(1) a tensile strength in at least one direction of at least 7 MPa;

(2) a piercing strength of at least 3.0 g/μm;

(3) an air-permeability of not more than 200 seconds/100 cc;

(4) a bubble point of 0.1–5.0 kg/cm$^2$;

(5) a porosity of at least 30%; and (6) a film thickness of 1–200 μm.

In order to apply the porous film of a high molecular weight polyolefin in this invention to a separator for an aqueous electrolyte batteries, the film has to be made hydrophilic. A method for making the film hydrophilic involves one of the methods selected from the group consisting of a method for treating with a surfactant, a method for treating the surface of the film with a sulfonating agent for surface modification, a method for adding functional groups by treating the surface with fluorine gas and the like, one of the methods selected from the group consisting of a corona discharge treatment, a plasma treatment, and a treatment with electron beam, and a method for graft-polymerization of a vinyl monomer containing hydrophilic groups onto the surface of the film or a combination of these methods.

Among these methods, a method using a surfactant or a sulfonating agent is preferable for a battery separator in view of battery characteristics.

As a method for combining (graft-polymerization) a vinyl monomer containing hydrophilic groups with the surface of the film for imparting hydrophilic property thereto, there can be mentioned, for example, applying a vinyl monomer containing hydrophilic groups onto the surface of the film followed by irradiating it with electron beams.

Illustrative of the vinyl monomer containing hydrophilic groups are, for example, unsaturated carboxylic acids such as acrylic acid and methacrylic acid; vinyl esters of carboxylic acids such as vinyl acetate; and a mixture of these compounds.

It is important that the separator film for aqueous electrolyte batteries which comprises the porous film of a high molecular weight polyolefin of this invention possesses the following physical characteristics:

(1) a tensile strength in at least one direction of at least 7 MPa;

(2) a piercing strength of at least 3.0 g/μm;

(3) an air-permeability of not more than 300 seconds/100 cc;

(4) a bubble point of 0.1–5.0 kg/cm$^2$;

(5) an electrolytic liquid retention rate of at least 200%, (6) a film thickness of 1–200 μm.

The aforesaid characteristics in the present invention were measured according to the following methods (Intrinsic Viscosity)

The intrinsic viscosity defined herein was measured at 135° C. in decaline as a solvent. The method for measurement is based on ASTM D4020.

(Measurement of the Thickness of Film)

The thickness of the film was measured by the aid of a film-thickness measuring apparatus named Miniax (Model DH-150) made by Tokyo Seimitsu KK.

(Porosity)

A sample was weighed and the thickness as a dense film was determined by calculation, deeming density of the film as 0.95 g/cm$^3$. Porosity was determined using the following equation, in relation with the value determined by the aforesaid film-thickness measuring apparatus:

$$\text{Porosity(volume\%)} = \frac{T_0 - T_w}{T_0} \times 100$$

wherein $T_0$ stands for thickness of the actual film measured by the film-thickness measuring apparatus, and $T_w$ for thickness of a dense film of 0% in porosity determined by calculation from the weight.

(Tensile Strength)

This factor was measured and calculated at room temperature (23° C.) by the aid of a tensile strength tester named Tensilon (Model RTM 100) made by Orientec Sha in accordance with ASTM D882, Method A (width of test samples: 15 mm).

(Air-permeability)

The air-permeability of the film was measured according to ASTM D726 by the aid of a standard Gurley Densometer (Toyo Seiki Seisakusho: Gurley Densometer Type B) for measuring Gurley seconds.

(Measurement of Melting Point)

The melting point referred to in the present invention was measured according to ASTM D3417 by the aid of a differential scanning calorimeter (DSC).

(Crystallinity)

The crystallinity referred to in the present invention was determined by calculation as a ratio of a heat of fusion to a theoretical heat of crystal fusion, the heat of fusion being simultaneously measured at the time of measuring the melting point according to ASTM D3417 with the aid of a differential scanning calorimeter (DSC).

(Orientation Coefficient)

The orientation coefficient was measured with the aid of an X-ray diffraction apparatus (Model No. RU 300) manufactured by Rigaku Denki Co.

(Bubble Point)

The bubble point was measured according to ASTM F316-70 by dipping the film into a 1% by weight aqueous solution of a surfactant for 30 minutes and this solution was used as such for measurement. Polyoxyethylene higher alcohol ether (Emulgen 709 manufactured by Kao) was used as the surfactant.

(Piercing Strength)

This factor was measured at 23° C. by the aid of a tensile strength tester named Tensilon (Model RTM 100) manufactured by Orientec Sha under the condition of a crosshead speed of 100 mm/min. The piercing needle with a tip of 0.5 mmR and a diameter of 1 mm was used. The piercing strength was determined as a quotient of a force breaking the film with the needle by the aforesaid $T_w$ (thickness calculated from weight).

(Electrolytic Liquid Retention Rate)

Three pieces of a test film having a size of 10×10 cm were collected and their weight W in the state of moisture equilibrium were measured. Next, the test pieces were dipped for one hour into an aqueous solution of KOH having a specific gravity of 1.3, pulled up from the solution, hung by picking up one corner of the film and weighed their weight $W_2$ after 10 minutes. This factor was calculated according to the following equation:

$$\text{Electrolytic liquid retention rate}(\%) = \frac{W_2}{W} \times 100$$

<Effect of Invention>

In accordance with the present invention, there is provided a porous film of a high molecular weight polyolefin, which film can be obtained by preparing an air-impermeable sheet or film from the starting high molecular weight polyolefin without adding thereto a plasticizer and/or a solvent and subjecting the air-impermeable sheet or film to a thermal treatment.

This porous film is suitably utilized by its excellent physical properties such as strength and air-permeability for use in filtering materials, separators for aqueous electrolyte batteries, separator films for batteries and electrolytic capacitors, and air-permeable films, for moisture-permeable but water-proof purpose such as paper diaper and house-wrapping film, and for other uses in the fields of cloth, package and printing.

EXAMPLES

The present invention will now be illustrated in more detail by way of Examples. It is to be construed however that the present invention is not limited to these Examples. In these Examples, percentage is shown by weight unless otherwise indicated.

Experimental Example 1

(Preparation of Precursor film)

According to items of a specification shown in Table 1 and using an inflation film shaping apparatus shown in FIG. 1, an inflation film of a high molecular weight polyethylene was shaped.

TABLE 1

| Items of specification | Size |
| --- | --- |
| Outer diameter of Screw | 60 mmφ |
| Effective length of Screw (L'/D') | 34 |
| Flight pitch | 36 mm |
| Screw compression ratio | 18 |
| Length of Tube die (L) | 830 mm |
| Length/diameter ratio of Tube die (L/D) | 25 |
| Inner diameter of Tube die at Die exit | 36 mmφ |
| Outer diameter of Mandrel at Die exit | 30 mmφ |
| S1/S2 | 1.40 |
| S2/S3 | 1.57 |
| Inner diametr of Gas flow path in Screw | 7 mmφ |

In the Table 1, S1 stands for a cross section area of a resin flow path in an entrance portion 4 of the tube die, S2 for a cross section area of a resin flow path in the middle portion 5 of the tube die, and S3 for a cross section area of a resin flow path in an exit portion 6 of the tube die.

An inflation film of polyethylene was shaped by using polyethylene powder (an intrinsic viscosity [η]=16.5 dl/g, a bulk density of 0.45 g/cm³), maintaining the temperatures at extruder 1, the middle portion 2 of the die and the exit portion 3 of the die at 280° C., 180° C., and 150° C., respectively, setting an extrusion amount to about 3 kg/hr, blowing compressed air through a gas flow path involved in the screw, cooling the film to solid in such manner that an inflated tubular film was contacted with an inner diameter of a cooling ring 7 having a diameter adapted for a diameter of the inflated tubular film while the film was folded along a stabilizing plate 8 at the same time, and taking up the film at a predetermined velocity by the aid of a pinch roll 9. The cooling ring was replaced by one having a proper inner diameter according to the magnitude of expansion ratio of the film. Table 2 shows the shaping conditions and the characteristic properties of the resultant film.

TABLE 2

| Precursor film No. | 1 | 2 |
| --- | --- | --- |
| Shaping   Draft ratio | 8.7 | 12.8 |
| Condition  Expansion ratio | 8 | 9 |
| Characteristic properties of the resultant film | | |
| Thickness of film (μm) | 45.2 | 30.0 |
| Tensile strength (GPa) | | |
| MD | 0.18 | 0.23 |
| TD | 0.24 | 0.25 |
| Piercing strength (g/μm) | 41.8 | 45.0 |
| Intrinsic viscosity [η] (dl/g) | 8.2 | 8.3 |
| Orientation coefficient | | |
| fa | 0.31 | 0.38 |
| fc | −0.01 | −0.04 |
| Air-permeability (seconds/100 cc) | >10,000.00 | >10,000 |

Experimental Example 2

(Making the Film Porous)

Figure 2:
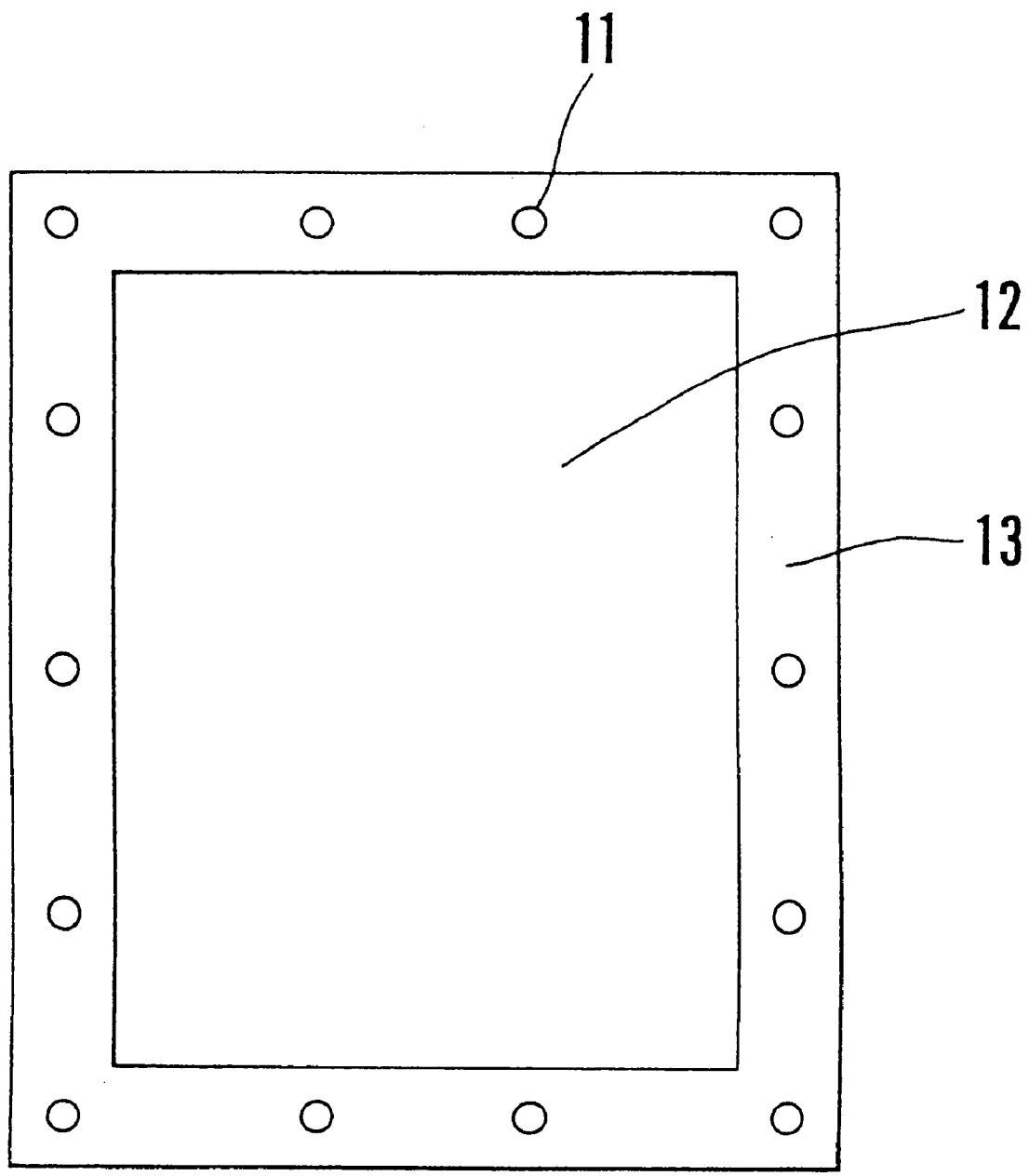
FIG. 2 is a drawing showing one example of a metal frame for fixing a precursor film during a thermal treatment thereof.

Using the precursor film shaped in Experimental Example 1, a thermal treatment was carried out in the following manner:

The precursor film 12 was held between a pair of stainless steel metal frames 13 as shown in FIG. 2, and fixed to the upper and lower metal frames with screws 11 so as to fix four corners of the film. The film in this state was dipped into a liquid for the thermal treatment (the first liquid) in a tank for a predetermined time.

(Dipping into the Second Liquid followed by Drying)

The film fixed to the metal frames was taken out from the thermal treatment tank and cast as such into a tank filled with a second liquid. The film was taken up from the second liquid and air dried at room temperature (23° C.). The film was then taken out from the metal frames and used as a sample for measurement.

The treatment conditions and results are shown in Tables 3 and 4 below.

TABLE 3

| Exp. No. | Precursor film No. | Conditions for Thermal Treatment | | | Conditions for Dipping and Drying Treatment | | | |
|---|---|---|---|---|---|---|---|---|
| | | First liquid | Treatment Temp. (° C.) | Treatment Time (m) | Second liquid | Dipping Temp. (° C.) | Dipping Time (m) | Drying Condition |
| 1 | 1 | P. Oil* | 127.5 | 2 | X*2 | 30 | 5 | air dry*3 |
| 2 | 1 | P. Oil | 128.5 | 2 | X | 30 | 5 | air dry |
| 3 | 1 | P. Oil | 129.5 | 2 | X | 30 | 5 | air dry |
| 4 | 1 | P. Oil | 130.0 | 2 | X | 30 | 5 | air dry |
| 5 | 2 | P. Oil | 129.3 | 2 | X | 30 | 5 | air dry |

(Remarks)
*"P. Oil" is an abbreviation of Paraffin Oil marketed by Witco, Viscosity index is 11–14 cSt at 40° C. (trade name: Carnation)
*2X denotes "HFC225bc" which is a halogenated hydrocarbon named 1,3-dichioro-1,1,2,2,3-pentafluoropropane.
*3"air dry" is conducted at room temperature.

TABLE 4

| Exp. No. | Thickness of film (μm) | Porosity (%) | Air-permeability (second/ 100 cc) | Tensile strength (MPa) MD | Tensile strength (MPa) TD | Piercing strength (g/μm) | Bubble point (kg/cm²) |
|---|---|---|---|---|---|---|---|
| 1 | 123.8 | 65.2 | 400 | 22.2 | 46.6 | 18.6 | 6.3 |
| 2 | 156.8 | 70.9 | 288 | 10.7 | 27.2 | 8.4 | 3.1 |
| 3 | 194.0 | 76.4 | 192 | 5.6 | 17.6 | 6.8 | 1.5 |
| 4 | 166.4 | 72.5 | >10,000 | 6.5 | 16.4 | 7.9 | — |
| 5 | 88.0 | 62.3 | 912 | 16.4 | 30.5 | 11.6 | 6.5 |

(Remarks)
In Exp. No. 4, the value of Air-permeability was increased as the treatment temperature was elevated Experimental Example 3

(Stretching)

Stretching was carried out using the porous film obtained in Experimental Example 2. Using a biaxially stretching machine of a tenter clip type (manufactured by Toyo Seiki), the film was stretched in the air at a stretching rate of 1.5 m/min. the stretching mode was a fixed width uniaxial stretching and a successive biaxial stretching. The stretching conditions and results are shown in Tables 5 and 6.

TABLE 5

| Exp. No. | Exp. No. of porous film | Stretch ratio MD × TD | Stretching temp. (° C.) |
|---|---|---|---|
| 6 | 1 | 2 × 1 | 120 |
| 7 | 1 | 3 × 1 | 120 |
| 8 | 2 | 2 × 1 | 120 |
| 9 | 2 | 3 × 1 | 120 |
| 9-1 | 2 | 3 × 2 | 130 |
| 9-2 | 2 | 3 × 3 | 130 |
| 10 | 3 | 2 × 1 | 120 |
| 11 | 3 | 3 × 1 | 120 |
| 12 | 4 | 2 × 1 | 100 |
| 13 | 4 | 3 × 1 | 100 |
| 14 | 4 | 4 × 1 | 100 |
| 15 | 4 | 5 × 1 | 100 |
| 16 | 4 | 2 × 1 | 120 |
| 17 | 4 | 3 × 1 | 120 |
| 18 | 4 | 4 × 1 | 120 |
| 19 | 4 | 2 × 2 | 120 |
| 20 | 5 | 2 × 1 | 100 |
| 21 | 5 | 2 × 1 | 120 |
| 22 | 5 | 3 × 1 | 120 |
| 23 | 5 | 2 × 2 | 120 |

TABLE 6

| Exp. No. | Thickness of film (μm) | Porosity (%) | Air-permeability (second/ 100 cc) | Tensile strength (MPa) MD | Tensile strength (MPa) TD | Piercing strength (g/μm) | Bubble point (kg/cm²) |
|---|---|---|---|---|---|---|---|
| 6 | 79.0 | 73.8 | 67 | 37.6 | 31.4 | 29.5 | 3.4 |
| 7 | 54.2 | 73.6 | 56 | 59.1 | 21.1 | 31.1 | 3.5 |
| 8 | 111.3 | 79.4 | 51 | 19.0 | 20.4 | 14.1 | 2.6 |
| 9 | 63.1 | 77.6 | 34 | 29.7 | 24.9 | 21.6 | 2.5 |
| 9-1 | 14.0 | 39.2 | 80 | 109.1 | 107.0 | 45.2 | 2.3 |
| 9-2 | 7.8 | 31.7 | 60 | 128.0 | 185.0 | 58.7 | 2.8 |
| 10 | 118.0 | 80.5 | 54 | 14.0 | 11.9 | 10.6 | 1.5 |
| 11 | 52.1 | 74.1 | 40 | 33.9 | 14.3 | 14.3 | 1.6 |
| 12 | 171.4 | 80.3 | 134 | 7.7 | 12.5 | 9.6 | 1.2 |
| 13 | 134.1 | 84.0 | 26 | 9.5 | 9.4 | 10.6 | 1.3 |
| 14 | 107.5 | 84.6 | 28 | 15.4 | 8.1 | 12.2 | 1.4 |
| 15 | 80.3 | 83.3 | 40 | 24.1 | 8.2 | 14.1 | 1.4 |
| 16 | 135.1 | 79.6 | 51 | 11.5 | 12.9 | 11.6 | 1.4 |
| 17 | 106.5 | 82.3 | 27 | 14.1 | 8.2 | 11.2 | 1.4 |
| 18 | 82.4 | 83.0 | 30 | 24.1 | 10.3 | 15.4 | 1.5 |
| 19 | 94.1 | 84.4 | 15 | 7.9 | 13.8 | 1i.i | 1.1 |
| 20 | 79.1 | 74.3 | 130 | 20.6 | 19.0 | 12.3 | 4.1 |
| 21 | 60.9 | 69.3 | 136 | 34.5 | 20.6 | 18.6 | 5.0 |
| 22 | 44.1 | 73.0 | 78 | 44.4 | 21.3 | 14.6 | 3.8 |
| 23 | 37.0 | 75.6 | 38 | 23.9 | 36.8 | 17.4 | 4.5 |

Experimental Example 4

(Thermosetting)

Using the porous film obtained in Experimental Example 3, thermosetting is carried out in a manner such that an air-oven (manufactured by Tabai) was used and the film was fixed in two directions. The conditions for thermosetting and results are shown in Tables 7 and 8.

TABLE 7

| Exp. No. | Exp. No. of porous film | Thermal treatment Temperature (° C.) | Thermal treatment Time (min.) |
|---|---|---|---|
| 24 | 6 | 131 | 5 |
| 25 | 8 | 131 | 5 |
| 26 | 10 | 131 | 5 |

TABLE 8

| Exp. No. | Thickness of film (μm) | Porosity (%) | Air-permeability (second/100 cc) | Tensile strength (MPa) MD | Tensile strength (MPa) TD | Piercing strength (g/μm) | Bubble point (kg/cm²) |
|---|---|---|---|---|---|---|---|
| 24 | 45.1 | 50.0 | 149 | 77.8 | 68.4 | 21.8 | 3.5 |
| 25 | 83.7 | 73.0 | 41 | 29.7 | 24.9 | 17.7 | 2.1 |
| 26 | 130.1 | 82.0 | 23 | 11.4 | 10.9 | 12.7 | 1.1 |

Experimental Example 5

(Preparation of Precursor Film)

Using the same shaping apparatus as in Experimental Example 1, an inflation film of a high molecular weight polyethylene was shaped. Table 9 shows the shaping condition and the characteristic properties of the resultant film.

TABLE 9

| Precursor film No. | | 3 | 4 | 5 |
|---|---|---|---|---|
| Starting material [η] (dl/g) | | 5.0 | 8.7 | 16.5 |
| Shaping Extruder | Temperature condition (° C.) | | | |
| | 330 | 330 | 240 | |
| Condition | Central portion of die | 210 | 210 | 220 |
| | Exit portion of die | 160 | 165 | 165 |
| | Draft ratio | 14.6 | 13.5 | 12.3 |
| | Expansion ratio | 7.4 | 8.1 | 8.0 |
| Characteristic properties of the resultant film | | | | |
| Thickness of film (μm) | | 17.7 | 17.9 | 20.6 |
| Tensile strength (GPa) | | | | |
| MD | | 0.14 | 0.19 | 0.27 |
| TD | | 0.14 | 0.18 | 0.27 |
| Piercing strength (g/pm) | | 23.1 | 33.2 | 43.5 |
| Intrinsic viscosity [η] (dl/g) | | 5.0 | 6.9 | 8.1 |
| Orientation coefficient | | | | |
| fa | | 0.25 | 0.35 | 0.39 |
| fc | | 0.05 | −0.01 | −0.03 |
| Air-permeability (seconds/100 cc) | | >10,000 | >10,000 | >10000 |

Experimental Example 6

(Making the Film Porous)

Using the precursor film shaped in Experimental Example 5, a thermal treatment was carried out in the same manner as in Experimental Example 2.

Tables 10 and 11 show the treating conditions and the results.

TABLE 10

| Exp. No. | Precursor film No. | Conditions for Thermal Treatment First liquid | Conditions for Thermal Treatment Treatment Temp. (° C.) | Conditions for Thermal Treatment Treatment Time (m) | Conditions for Dipping and Drying Treatment Second liquid | Conditions for Dipping and Drying Treatment Dipping Temp. (° C.) | Conditions for Dipping and Drying Treatment Dipping Time (m) | Conditions for Dipping and Drying Treatment Drying Condition |
|---|---|---|---|---|---|---|---|---|
| 27 | 3 | P. Oil* | 124 | 2 | X*² | 30 | 5 | air dry*³ |
| 28 | 3 | P. Oil | 128 | 2 | X | 30 | 5 | air dry |
| 29 | 4 | P. Oil | 132 | 2 | X | 30 | 5 | air dry |
| 30 | 5 | P. Oil | 130 | 2 | X | 30 | 5 | air dry |
| 31 | 5 | P. Oil | 132 | 2 | X | 30 | 5 | air dry |

(Remarks)
*"P. Oil" is an abbreviation of Paraffin Oil marketed by Witco, Viscosity index is 11–14 cSt at 40° C (trade name: Carnation)
*²X denotes n-hexane.
*³"air dry" was conducted at room temperature.

TABLE 11

| Exp. No. | Thickness of film (μm) | Porosity (%) | Air-permeability (second/100 cc) | Tensile strength (MPa) MD | Tensile strength (MPa) TD | Piercing strength (g/μm) | Bubble point (kg/cm²) |
|---|---|---|---|---|---|---|---|
| 27 | 42.5 | 52.6 | 400 | 40.6 | 45.6 | 9.4 | 5.8 |
| 28 | 67.0 | 73.4 | 95 | 7.6 | 5.8 | 5.0 | 1.3 |
| 29 | 46.0 | 61.5 | 518 | 37.5 | 23.8 | 18.3 | 6.9 |
| 30 | 40.0 | 51.0 | 978 | 54.6 | 88.2 | 30.3 | >7.0 |
| 31 | 53.0 | 58.1 | 720 | 53.3 | 49.4 | 26.5 | >7.0 |

(Remarks)
In Exp. Nos. 30 and 31, the values of Babble point was increased as the treating temperature was elevated.

In Exp. Nos. 30 and 31, the values of Babble point was increased as the treating temperature was elevated.

Experimental Example 7

(Preparation of Precursor Film)

A film was shaped under the conditions shown in Table 12 by using a conventional inflation film shaping machine (an extrusion shaping machine manufactured by Thermoplastic Inc., 30 mmφ, L/D=25).

TABLE 12

| Precursor film No. | | 6 |
|---|---|---|
| | Starting material [η] (dl/g) | 3.2 |
| | Temperature condition (° C.) | |
| Shaping Condition | Extruder | 200 |
| | Central portion of die | 200 |
| | Exit portion of die | 200 |

TABLE 12-continued

| | Precursor film No. | 6 |
|---|---|---|
| | Draft ratio | 12.0 |
| | Expansion ratio | 5.0 |
| | Thickness of film (μm) | 30.4 |
| | Tensile strength (GPa) | |
| | MD | 0.031 |
| | TD | 0.025 |
| Characteristic | Piercing strength (g/μm) | 9.5 |
| property of film | Intrinsic viscosity [η] (dl/g) | 3.2 |
| | Orientation coefficient | |
| | fa | 0.25 |
| | fc | −0.01 |
| | Air-permeability (sec/100 cc) | >10000 |

Experimental Example 8
(Making the Film Porous)

Using the precursor film shaped in Experimental Example 7, a thermal treatment was carried out in the same manner as in Experimental Example 2. Tables 13 and 14 show the treating conditions and results, respectively.

TABLE 13

| | | Conditions for Thermal Treatment | | | Conditions for Dipping and Drying Treatment | | | |
|---|---|---|---|---|---|---|---|---|
| Exp. No. | Precursor film No. | First liquid | Treatment Temp. (° C.) | Treatment Time (m) | Second liquid | Dipping Temp. (° C.) | Dipping Time (m) | Drying Condition |
| 36 | 6 | P. Oil* | 120 | 2 | X*² | 30 | 5 | air dry*³ |

(Remarks)
*"P. Oil" is an abbreviation of Paraffin Oil marketed by Witco, Viscosity index is 11–14 cSt at 40° C.
(trade name: Carnation)
*²X denotes n-hexane
*³"air dry" is conducted at room temperature.

TABLE 14

| Exp. No. | Thickness of film (μm) | Porosity (%) | Air-permeability (second/100 cc) | Tensile strength (MPa) MD | TD | Piercing strength (g/μm) | Bubble point (kg/cm²) |
|---|---|---|---|---|---|---|---|
| 36 | 30.9 | 55.0 | 163 | 6.1 | 9.8 | 4.3 | 2.7 |

Experimental Example 9
(Stretching)

Using the porous film obtained in Experimental Example 8, a stretching treatment was carried out in the same mannr as in Experimental Example 3 Tables 15 and 16 show the stretching condition and results, respectively.

TABLE 15

| Exp. No. | Exp. No. of porous film | Stretch ratio MD × TD | Stretching temp. (° C.) |
|---|---|---|---|
| 37 | 6 | 2 × 1 | 120 |
| 38 | 6 | 1.5 × 1.5 | 120 |

TABLE 16

| Exp. No. | Thickness of film (μm) | Porosity (%) | Air-permeability (second/100 cc) | Tensile strength (MPa) MD | TD | Piercing strength (g/μm) | Bubble point (kg/cm²) |
|---|---|---|---|---|---|---|---|
| 37 | 20.6 | 64.4 | 40 | 20.0 | 5.3 | 8.5 | 2.2 |
| 38 | 33.7 | 74.9 | 20 | 3.9 | 7.2 | 3.4 | 1.5 |

Experimental Example 10
(Treatment for Making the Film Hydrophilic)

Using the porous film obtained in Experimental Example 3, a treatment for making the film hydrophilic was carried out by dipping the film into a 1 wt % aqueous solution of a surfactant for 10 minutes, drying it naturally, immersing it in fuming sulfuric acid for 10 minutes, washing it with water at a low temperature and drying it naturally.

In the above treatment, polyoxyethylene higher alcohol ether (Emulgen 709, manufactured by Kao) was used as the surfactant and 25% fuming sulfuric acid was used as the fuming sulfuric acid.

Table 17 shows various physical properties of the resultant film.

TABLE 17

| Exp. Ex. | Exp. No. of film before the treatment* | Thickness (μm) | Air-permeability (sec/100 cc) | Tensile strength (MPa) MD | TD | Piercing strength (g/μm) | Bubble point (kg/cm²) | Electrolytic liquid retention rate (%) |
|---|---|---|---|---|---|---|---|---|
| 32 | 16 | 125.0 | 68 | 13.1 | 12.3 | 11.9 | 1.6 | 360 |
| 33 | 17 | 78.2 | 68 | 21.5 | 13.5 | 12.3 | 1.5 | 380 |

TABLE 17-continued

| Exp. Ex. | Exp. No. of film before the treatment* | Thickness (μm) | Air-permeability (sec/100 cc) | Tensile strength MD (MPa) | Tensile strength TD (MPa) | Piercing strength (g/μm) | Bubble point (kg/cm$^2$) | Electrolytic liquid retention rate (%) |
|---|---|---|---|---|---|---|---|---|
| 34 | 18 | 47.6 | 84 | 41.3 | 15.2 | 15.3 | 2.5 | 560 |
| 35 | 21 | 52.8 | 114 | 32.7 | 20.1 | 18.2 | 4.3 | 420 |

(Remarks)
*treatment for making film hydrophilic

As is evident from the above results, a hydrophilic porous film excellent in air-permeability, tensile strength, piercing strength, bubble point and electrolytic liquid retention rate can be obtained by subjecting the porous film of the present invention to a treatment for making the film hydrophilic.

The film possessing such physical properties are suitable for use in separators of the aforesaid aqueous electrolyte batteries or the like.

It is understood that the preceding representative Examples may be varied within the scope of the present specification both as to ingredients and treating conditions, by those skilled in the art to achieve essentially the same results. As many widely different embodiments of this invention may be made without departing from the spirit and scope thereof, it is to be construed that this invention is not limited to the specific embodiments thereof except as defined in the appended claims.

What is claimed is:

1. A porous film of a high molecular weight polyolefin possessing the following physical properties:

(1) a tensile strength in at least one direction of at least 15 MPa;
   (2) a piercing strength of at least 3.0 g/μm;
   (3) an air-permeability of not more than 200 seconds/100 cc;
   (4) a bubble point of 0.1–5.0 kg/cm$^2$;
   (5) a porosity of at least 30%; and
   (6) a film thickness of 10–200 μm, which is obtained by subjecting an air-impermeable film of a high molecular polyolefin substantially free of a plasticizer and/or a solvent to a thermal treatment for making the film porous at a temperature of 80 to 160° C. for 30 seconds to 5 minutes and stretching the resultant porous film (A) in at least one direction or by stretching the porous film (A) in at least one direction followed by subjecting the stretched film to a thermosetting treatment comprising further heating the porous film (A) and fixing it in two directions.

2. A porous film of a high molecular weight polyolefin according to claim 1, wherein the high molecular weight polyolefin is high molecular weight polyethylene.

3. A separator film for aqueous electrolyte batteries comprising a porous film of a high molecular weight polyethylene having the following physical properties:

(1) a tensile strength in at least one direction of at least 15 MPa;
   (2) a piercing strength of at least 3.0 g/μm;
   (3) an air-permeability of not more than 300 seconds/100 cc;
   (4) a bubble point of 0.1–5.0 kg/cm$^2$;
   (5) an electrolytic liquid retention rate of at least 200%; and
   (6) a film thickness of 10–200 μm, obtained by subjecting an air-impermeable film of a high molecular weight polyolefin substantially free from a plasticizer and/or a solvent to a thermal treatment for making the film porous at a temperature of 80 to 160° C. for 30 seconds to 5 minutes, stretching the resultant porous film in at least one direction or stretching the resultant porous film in at least one direction followed by subjecting the film to thermosetting comprising further heating the porous film and fixing it in two directions and then subjecting the resultant porous film (B) to a treatment for making it hydrophilic.

4. A porous film of a high molecular weight polyethylene having an intrinsic viscosity (η) of 5–20 dl/g and composed of nervate and/or reticulate fibrils, wherein the film is constructed by fibrils comprising extended-chain crystals and lamellar crystals with a width of more than 1 μm and/or fibrils comprising helicoidal crystals with a width of more than 1 μm, and wherein the film is obtained by subjecting an air-impermeable film of the high molecular weight polyethylene substantially free from a plasticizer and/or a solvent to a thermal treatment to make the film porous at a temperature of 115 to 140° C. for 30 seconds to 5 minutes.

5. A porous film of a high molecular weight polyethylene possessing the following physical properties:

(1) a tensile strength in at least one direction of at least 15 MPa;
   (2) a piercing strength of at least 3.0 g/μm;
   (3) an air-permeability of not more than 200 seconds/100 cc;
   (4) a bubble point of 0.1–5.0 kg/cm$^2$;
   (5) a porosity of at least 30%; and
   (6) a film thickness of 10–200 μm, which is obtained by subjecting an air-impermeable film of a high molecular polyolefin substantially free of a plasticizer and/or a solvent to a thermal treatment to make the film porous at a temperature of 115 to 140° C. for 30 seconds to 5 minutes and stretching the resultant porous film (A) in at least one direction or by stretching the porous film (A) in at least one direction followed by subjecting the stretched film to a thermosetting treatment comprising further heating the porous film (A) and fixing it in two directions.

6. A porous film of high molecular weight polyolefin having the following characteristics:

(1) a tensile strength in at least one direction of at least 15 MPa;
   (2) a piercing strength of at least 3.0 g/μm;
   (3) an air-permeability of not more than 200 seconds/100 cc;
   (4) a bubble point of 0.1–5.0 kg/cm$^2$;
   (5) a porosity of at least 30%; and
   (6) a film thickness of 1–200 μm.

7. A porous film of high molecular weight polyolefin according to claim 6, wherein a porous film obtained by subjecting an air-impermeable film substantially free from a plasticizer and/or a solvent of a thermal treatment for making the film porous is stretched in at least one direction or alternatively stretched in at least one direction and then subjected to further thermosetting treatment.

8. A porous film of high molecular weight polyolefin according to claim 7, wherein the air-impermeable film is a film obtained by an inflation film shaping method.

9. A porous film of high molecular weight polyolefin according to claim 6, wherein the high molecular polyolefin is a high molecular weight polyethylene.

10. A porous film of high molecular weight polyolefin having the following characteristics:

(1) a tensile strength in at least one direction of at least 15 MPa;

(2) a piercing strength of at least 3.0 g/µm;

(3) an air-permeability of not more than 300 seconds/100 cc;

(4) a bubble point of 0.1–5.0 kg/cm$^2$;

(5) an electrolytic liquid retention rate of at least 200%; and (6) a film thickness of 1–200 µm.

11. A porous film of high molecular weight polyolefin according to claim 10, wherein the film is obtained by subjecting a porous film claimed in claim 1 to a treatment for making the film hydrophilic.

12. A porous film of high molecular weight polyolefin according to claim 10, wherein an air-impermeable film substantially free from a plasticizer and/or a solvent is subjected to a thermal treatment for making the film porous to form a porous film and then the porous film is stretched in at least one direction or alternatively the porous film is stretched in at least one direction and then subjected to further thermosetting treatment and thereafter to a treatment for making the film hydrophilic.

13. A separator film for aqueous electrolyte batteries comprising a porous film claimed in claims 10.

* * * * *